April 24, 1956 A. FREIBERG 2,743,110

APPARATUS FOR PRODUCING ONE GROOVE BINAURAL RECORDS

Filed Feb. 26, 1953

INVENTOR.
Alan Freiberg
BY Zoltan P. Polachek
ATTORNEY.

United States Patent Office 2,743,110

Patented Apr. 24, 1956

2,743,110

APPARATUS FOR PRODUCING ONE GROOVE BINAURAL RECORDS

Alan Freiberg, New York, N. Y.

Application February 26, 1953, Serial No. 339,101

2 Claims. (Cl. 274—28)

This invention relates to new and useful improvements in apparatus for reproducing or recording, and for reproducing or playing single groove binaural phonograph records in which the side walls of the spiral groove have a laterally or zigzag cut sound track and the bottom of the single groove a hill and valley cut sound track.

Binaural records now produced have two bands, or groups of grooves, and are played with two needles. This reduces the recording space and playing time of such records to less than one-half of their potential, thus erasing the advantage of the longer playing modern records.

The present invention proposes the construction of improved apparatus for producing and playing such binaural records which will give a recording stylus or a reproducing needle pure translatory motion without any rise or dip in the lateral or zigzag motion of the stylus or needle and without any lateral movement in the hill and valley motion of the needle or stylus.

Another object of the present invention proposes forming the apparatus with two diaphragms arranged so that a pure and distinct binaural effect may be obtained both in recording and in reproducing such binaural records.

Still further, the present invention proposes constructing the apparatus so that neither the needle or stylus nor the diaphragms are moved by any lever action, and so that the apparatus may be used in the various methods of recording and reproduction.

As a further object, the present invention proposes arranging the apparatus so that the gravitational pull against the two diaphragms is minimized or so that the gravitational pull and the record resistance can be shared equally by the two diaphragms.

The present invention further proposes a novel apparatus which can use conventional cartridges so that existing phonographs may easily be converted by adding an amplifier and speaker unit and which can be used to play regular monaural records or to produce single groove binaural records which can be played on conventional phonographs.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

In a common process of recording monaural records, sound waves falling on a sensitive microphone produce variations in electric currents, which are amplified by valves. The amplified current operates a cutting tool through a diaphragm which tool cuts laterally into the grooves of a wax disc and the grooves thus cut in the wax represent the wave form of the sound received by the microphone. Older methods of recording mechanically directed the sound waves against the diaphragm directly, the forced vibrations of a stylus connected with the diaphragm providing the cutting motion of the stylus. The wax form produced by either method is then made electrically conducting with graphite and a layer of copper is deposited by electrolysis. The copper form is removed from the wax, and is a "negative" from which is made another more substantial "positive" for use as the master form from which hard negative dies are made for use in pressing records. Blank discs of plastic material are placed between the die plates in a hydraulic press where they receive an impression of the original track cut on the wax record. In the reproduction various types of heads are used, electromagnetic, photoelectric, and piezoelectric, to translate into electrical vibrations the vibrations of the phonograph needle and its diaphragm as the needle follows the groove. Electrical amplification of the signals generated by the lateral motion of the needle in the groove precedes the final input of the signal to a loud-speaker where a reproduction of the original sound is generated.

Binaural records have been produced heretofore with two bands or groups of grooves and reproduced or played with two needles. In addition, non-binaural records have been produced with a single groove having two distinct sound tracks in the groove, one laterally cut in the side walls of the groove and the other of the hill and valley type cut in the bottom of the groove. In producing such a record, sound receiving diaphragms have been used each transmitting its vibrations to a single cutting tool and each diaphragm operating upon the tool independently of the other diaphragm, the diaphragms and tool being linked together by levers.

Figure 1:
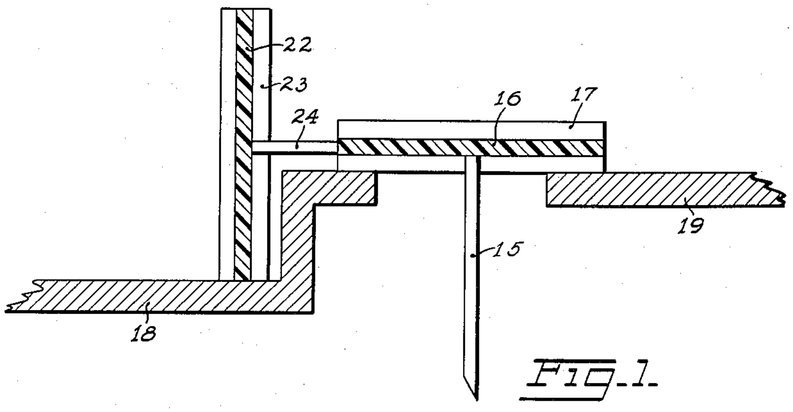
Fig. 1 is a diagrammatic view illustrating the apparatus of the present invention.

The apparatus of the present invention, in accordance with the first form shown in Fig. 1, has a recording cutting stylus or playing needle 15 directly connected to a diaphragm 16 mounted in a diaphragm housing 17 which rests on parts 18 and 19 of a recording or reproducing tone arm. Diaphragm 16 is disposed so that it will lie parallel to a recording blank or record 20 (see Fig. 3) so that vibrations of the diaphragm 16 will move the stylus 15 in hill and valley cutting movements in recording and so that in reproduction or playing the needle 15 will vibrate the diaphragm as it follows hill and valley cuts in the spiral groove 21 of record 20.

A second diaphragm 22 mounted in a housing 23 is disposed perpendicular to the first diaphragm 16 and parallel to the needle or stylus 15. The two diaphragms 16 and 22 are connected together by a rigid rod or member 24. Movement of the stylus 15 in recording by the two diaphragms 16 and 22 is a resultant of two separate movements. In reproduction, the two diaphragms are able to resolve this resultant into the two original, separate and distinct movements, with no overlapping of the one or the other. No lever action is used and the needle or stylus 15 is not moved in an arc, as it would be under lever action, but has pure translatory motion with no rise and dip in lateral or zigzag stylus or needle motion and no lateral movement in the hill and valley needle or stylus motion.

The diaphragms and housings are made to move on the tone arm parts 18 and 19 with the minimum of friction freely sliding thereon. Ball bearings (not shown) may be provided on the housings to reduce friction.

Figures 2, 3, 4, 5:
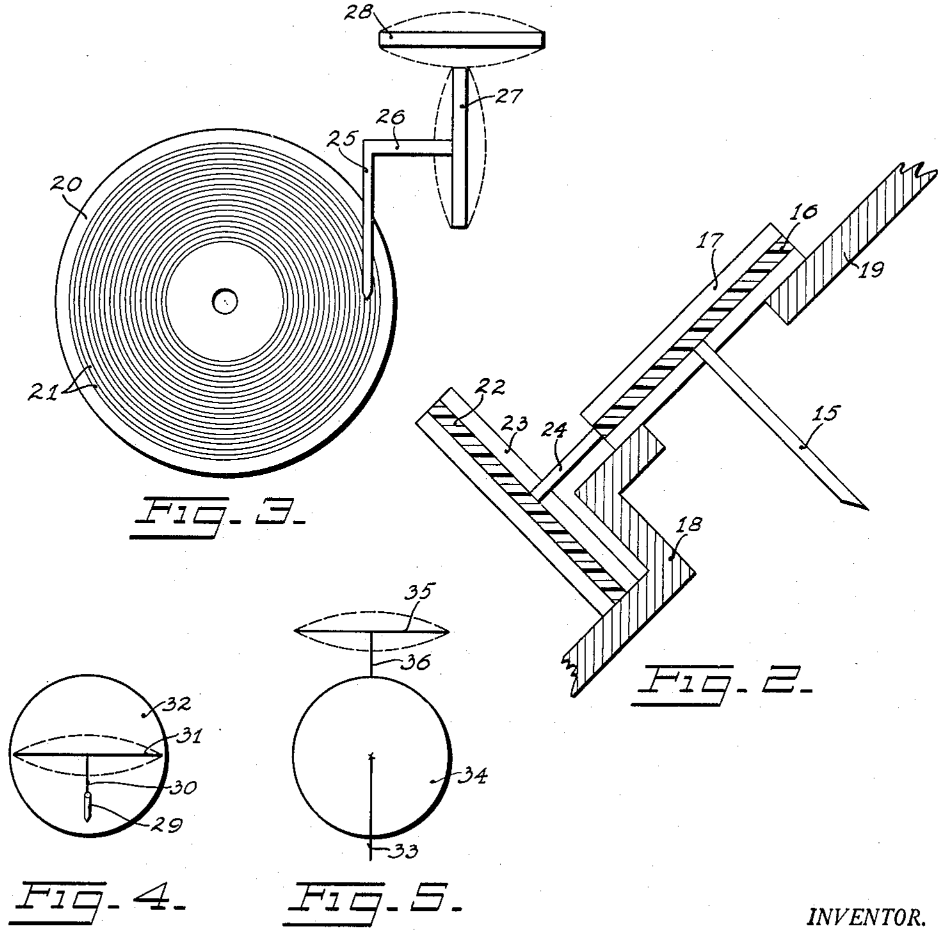
Fig. 2 is a view similar to Fig. 1 but showing a modification of the present invention.
Fig. 3 is a diagrammatic view showing a single groove binaural record and a modification of the apparatus shown in Figs. 1 and 2.
Fig. 4 is a diagrammatic view of two diaphragms and a needle or stylus, and connections therefor, illustrating another modification of the present invention.
Fig. 5 is a view similar to Fig. 4 but illustrating a still further modification of the present invention.

In the diagram of Fig. 1, the diaphragms and housings are disposed to minimize the pull by gravity. In Fig. 2, the entire apparatus shown in Fig. 1 is tilted at a forty-five degree angle from the horizontal so that the gravitational pull and record resistance can be shared equally by the two diaphragms. The record 20 in such a case would be provided with a non-circular hole.

The modification shown in Fig. 3 is characterized by the provision of a needle or stylus 25 connected by a rigid rod 26 to a diaphragm 27 mounted parallel to the needle or stylus 25 and a second diaphragm 28 mounted perpendicular to the needle or stylus 25 and to the first diaphragm 27, the two diaphragms 27 and 28 being connected together. The diaphragm 27 receives and transmits lateral or zigzag vibratory motions and the diaphragm 28 hill and valley vibratory motions.

The modification shown in Fig. 4 is characterized by the provision of a cutting stylus or recording needle 29 connected directly by a rigid member or rod 30 to the center of a hill and valley diaphragm 31 disposed perpendicular to the needle or stylus 29, the edge of the diaphragm 31 being connected with the center of a lateral or zigzag diaphragm 32 disposed parallel to the needle or stylus 29 and perpendicular to the first diaphragm 31.

In the modification illustrated in Fig. 5, a needle or stylus 33 is directly connected to the center of a diaphragm 34 disposed perpendicular to the needle or stylus 33 for hill and valley movement. A second diaphragm 35 is connected by a rigid rod 36 to the first diaphragm 34, the diaphragm 35 being disposed for lateral or zigzag movement of the needle or stylus 33.

Separate microphones (not shown) are used with the two diaphragms shown in each figure in recording and separate speakers are used in reproducing. Either separate amplifiers or a binaural amplifier (not shown) can be used, the diaphragms, microphones, amplifiers, speakers, etc., being hooked up or connected in the usual or conventional manner.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. Apparatus for recording sounds in a single groove on binaural records comprising, a cutting stylus, a diaphragm housing and a diaphragm therein connected directly and rigidly with the stylus and disposed for hill and valley cutting movement of the stylus, a second diaphragm housing and a diaphragm therein disposed for lateral cutting movement of the stylus through said first-named diaphragm, a tone arm supporting the diaphragm housings at right angles to each other, and a rigid member directly fastening the diaphragms together in spaced relation for vibration of the cutting stylus in a cutting movement which is a resultant of the two different movements of the diaphragms.

2. In apparatus for playing binaural records, a vertically disposed needle, a horizontally disposed diaphragm directly fastened to said needle and adapted for vibratory motion as the needle follows the hill and valley cuts in the groove of a binaural record, a vertically disposed diaphragm rigidly connected to the peripheral edge of the horizontally disposed diaphragm in spaced relation and being disposed parallel to the needle and being adapted for lateral movement by said horizontally disposed diaphragm as the needle follows the lateral cuts in the groove of a binaural record, the relative positions of the diaphragms being such that when said diaphragms are positioned on horizontally disposed tone arms the pull by gravity is minimized and when positioned on tone arms tilted at an angle to the horizontal gravitational pull and record resistance are equalized between the two diaphragms.

References Cited in the file of this patent

UNITED STATES PATENTS

| | | |
|---|---|---|
| 628,810 | Jones | July 11, 1899 |
| 1,166,602 | Keszthelyi et al. | Jan. 4, 1916 |
| 1,198,977 | Vignali | Sept. 19, 1916 |
| 1,520,378 | Waters | Dec. 23, 1924 |
| 1,855,150 | Jones | Apr. 19, 1932 |
| 1,946,599 | Tichenor | Feb. 13, 1934 |